No. 707,520. Patented Aug. 19, 1902.
F. H. PICKARD, Dec'd.
T. W. STANFIELD, Administrator.
RUNNING GEAR FOR WAGONS.
(Application filed Dec. 31, 1900.)
(No Model.)
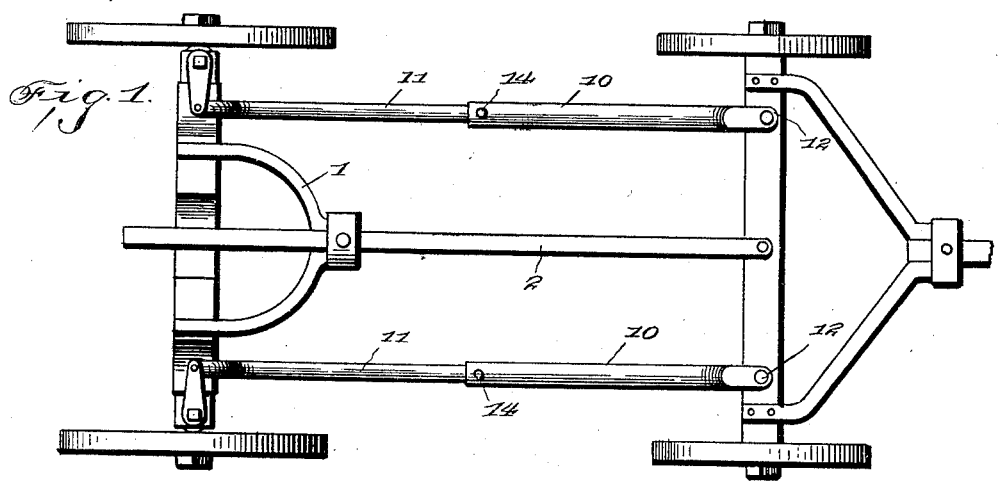
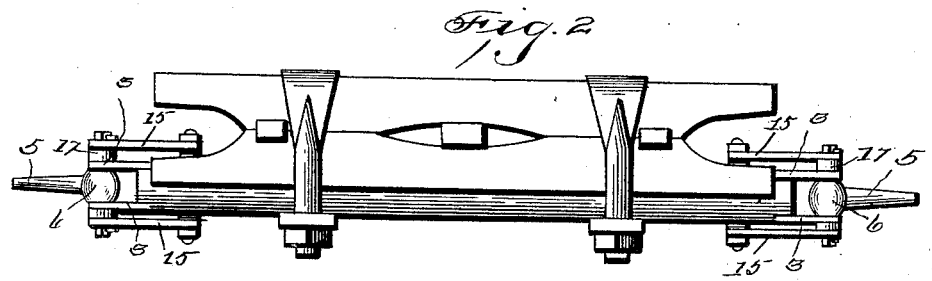
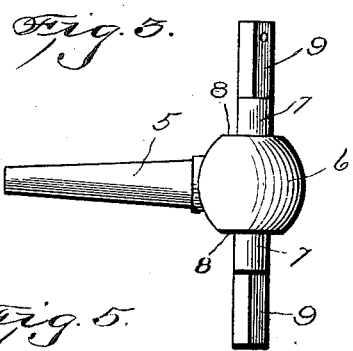
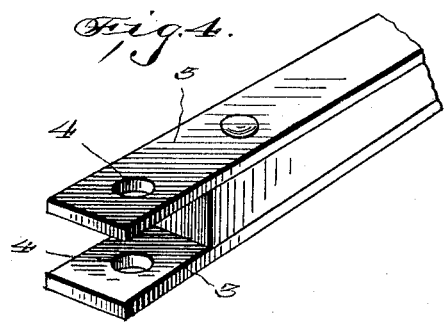
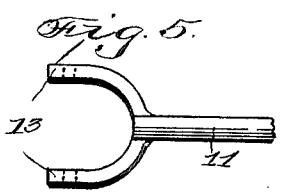
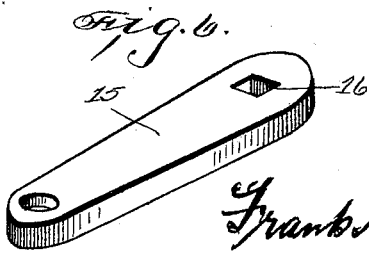
Witnesses
R. A. Boswell
Stephen N. Brooks
Inventor
Frank H. Pickard.
By
Attorneys
THE NORRIS PETERS CO., PHOTO-LITHO., WASHINGTON, D. C.

UNITED STATES PATENT OFFICE.

FRANK HENRY PICKARD, OF HILL CITY, TENNESSEE, ASSIGNOR OF ONE-HALF TO PAUL W. TREWHITT, OF HILL CITY, TENNESSEE; T. W. STANFIELD ADMINISTRATOR OF SAID FRANK HENRY PICKARD, DECEASED.

RUNNING-GEAR FOR WAGONS.

SPECIFICATION forming part of Letters Patent No. 707,520, dated August 19, 1902.

Application filed December 31, 1900. Serial No. 41,748. (No model.)

*To all whom it may concern:*

Be it known that I, FRANK HENRY PICKARD, a citizen of the United States of America, residing at Hill City, in the county of Hamilton and State of Tennessee, have invented certain new and useful Improvements in Running-Gears of Wagons, Buggies, and other Vehicles, of which the following is a specification, reference being had therein to the accompanying drawings.

My invention relates to certain new and useful improvements in running-gears of wagons, buggies, and other vehicles, and has for its object a device of this character, wherein the rear wheels of the vehicle will follow the direction assumed by the front wheels in turning the vehicle, the rear wheels to these ends having their every movement controlled by the front ones.

The invention has for its further object a device of this character which will be extremely simple both in its operation and economical construction.

With the above and other objects in view the invention further resides in the novel details of construction and combination of parts to be fully described in the following specification and then set forth in the claims.

Referring to the accompanying drawings, illustrating the invention, and wherein like characters of reference indicate similar parts throughout the several views, Figure 1 is a top plan view. Fig. 2 is a rear elevation with the wheels removed. Fig. 3 is an elevation of one of the spindles employed for the rear wheels. Fig. 4 is a perspective view of one end of the rear axle. Fig. 5 is an elevation of the forks carried by the telescopic rods. Fig. 6 is a perspective view of one of the arms employed in connection with the rear spindles.

The frame of the vehicle is not unlike those commonly employed, though I have illustrated one which may be adjusted through the means of the rear hounds 1 and the coupling or reach 2. The rear axle carries a pair of plates 3 3, which may be secured thereto in any suitable manner, the ends of the plates extending beyond the ends of the axle and being apertured, as at 4 4. The rear wheels are mounted on spindles 5, carrying vertical members which are enlarged, as at 6, and which enlarged portion is received between the plates 3 3. This vertical member above and below its enlarged portion carries rounded shanks 7, which are received within the apertures 4 4 of the plates 3 3 and are adapted to freely rotate therein. It will be noted that the enlarged portion is flattened on its upper and lower face, as shown at 8 8, which forms a convenient support for the spindle by reason of its large bearing-surfaces engaging the plates. The rounded shanks 7 are preferably of a length equal to the thickness of the plates and above and below the latter merge into squared shanks 9 9. The front and rear axles are connected by means of horizontal telescopic rods 10 11, moving in planes parallel with one another, the former having a pivotal connection with the front axle, as at 12, and the latter carrying a forked end 13. These telescopic rods permit of the longitudinal adjustment of the vehicle-frame, they being secured in their adjusted position by any means, such as the screws 14. Secured to these square shanks 9 9 above and below plates 3 are levers 15, having a square aperture 16 in their one end receiving shanks 9 and forming a pivotal connection with the forks 13 of rods 11 at their other end which will readily communicate any movement of the front wheels to the rear ones, as will be understood. I may provide washers 17, which are interposed between the levers and the upper faces of the plates, as shown.

It will be perceived that the connecting-rods move in planes parallel with one another, which effectually prevents any interference of these rods with each other and causes a positive action in their every movement.

Having thus fully described my invention, what I claim as new, and desire to secure by Letters Patent, is—

1. In a device of the type set forth, the combination with the front and rear axles of a vehicle, of a pair of plates secured to the rear axles and extending beyond the ends thereof, a spindle carrying a vertical member comprising an enlarged portion received between said plates and rounded shanks extending through the plates, with squared shanks on the ends of the rounded shanks, levers connected to the squared shanks above and below the axle, and rods carrying a forked end movably secured to said levers, the other end of the rods being pivoted to the front axle, said rods being movable in parallel relation with each other.

2. In a device of the type set forth, the combination with the front and rear axles of a vehicle, of a spindle having a vertical member pivotally secured to each end of the rear axle, levers connected to the ends of the vertical member, and rods movable in parallel relation with each other pivoted to the front axle and carrying forked rear ends pivotally connected to said levers.

In testimony whereof I have signed my name in the presence of two subscribing witnesses.

FRANK HENRY PICKARD.

Witnesses:
T. W. STANFIELD,
C. F. CROWDER.